(12) United States Patent
Lee et al.

(10) Patent No.: US 10,771,003 B2
(45) Date of Patent: Sep. 8, 2020

(54) APPARATUS AND METHOD FOR CONTROLLING INVERTER FOR DRIVING MOTOR

(71) Applicants: HYUNDAI MOTOR COMPANY, Seoul (KR); KIA MOTORS CORPORATION, Seoul (KR)

(72) Inventors: Yong Jae Lee, Hwaseong-si (KR); Joo Young Park, Yongin-si (KR); Ho Joon Shin, Suwon-si (KR); Sung Kyu Kim, Bucheon-si (KR); Su Hyun Bae, Daegu (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 3 days.

(21) Appl. No.: 16/197,216

(22) Filed: Nov. 20, 2018

(65) Prior Publication Data

US 2020/0021227 A1    Jan. 16, 2020

(30) Foreign Application Priority Data

Jul. 11, 2018    (KR) .................. 10-2018-0080286

(51) Int. Cl.
| H02P 21/22 | (2016.01) |
| H02P 27/08 | (2006.01) |
| H02K 11/33 | (2016.01) |
| H02P 21/18 | (2016.01) |

(52) U.S. Cl.
CPC ............ H02P 27/085 (2013.01); H02K 11/33 (2016.01); H02P 21/18 (2016.02); H02P 21/22 (2016.02)

(58) Field of Classification Search
CPC ........ H02P 27/08; H02P 27/085; H02P 27/06; H02P 21/22; H02P 21/00; H02P 21/18; H02K 11/33
See application file for complete search history.

(56) References Cited

U.S. PATENT DOCUMENTS

| 6,005,783 A * | 12/1999 | Xue ...................... H02M 7/529 363/36 |
| 6,201,720 B1 * | 3/2001 | Tracy ................ H02M 7/53875 363/131 |
| 8,742,712 B2 * | 6/2014 | Perisic .................... H02P 27/12 318/400.02 |

(Continued)

FOREIGN PATENT DOCUMENTS

| KR | 10-1216464 B1 | 12/2012 |
| KR | 10-2014-0066063 A | 5/2014 |
| KR | 10-2016-0007850 A | 1/2016 |

*Primary Examiner* — Thai T Dinh
(74) *Attorney, Agent, or Firm* — Morgan, Lewis & Bockius LLP (57) ABSTRACT

An apparatus for controlling an inverter for a motor driving includes: a current controller configured to generate a d/q-axis voltage reference for allowing a d/q-axis current detection value, which is obtained by measuring a current supplied from the inverter to the motor, to converge on the d/q-axis current reference for driving the motor, and a voltage modulator configured to control switching of the inverter by selectively applying one among a plurality of predetermined pulse width modulations (PWM) based on a point at which the d/q-axis voltage reference is located in a hexagonal space voltage vector diagram.

13 Claims, 8 Drawing Sheets

(56) References Cited

U.S. PATENT DOCUMENTS

| | | | |
|---|---|---|---|
| 9,595,907 B2 | 3/2017 | Marohl et al. | |
| 9,722,520 B2* | 8/2017 | Tripathi | F03D 7/0272 |
| 10,498,216 B1* | 12/2019 | Lee | H02M 7/5395 |
| 2011/0164443 A1* | 7/2011 | Chen | H02M 7/53873 |
| | | | 363/132 |
| 2015/0032311 A1* | 1/2015 | Shao | H02M 7/53871 |
| | | | 701/22 |
| 2016/0006381 A1* | 1/2016 | Park | H02P 27/085 |
| | | | 318/400.02 |
| 2018/0236882 A1* | 8/2018 | Wang | B60L 11/1803 |

* cited by examiner

APPARATUS AND METHOD FOR CONTROLLING INVERTER FOR DRIVING MOTOR

CROSS REFERENCE TO RELATED APPLICATION

The present application claims priority of Korean Patent Application No. 10-2018-0080286 filed on Jul. 11, 2018, the entire contents of which is incorporated herein for all purposes by this reference.

TECHNICAL FIELD

The present disclosure relates to an apparatus for controlling an inverter for driving a motor, and more particularly, to an apparatus and a method for controlling an inverter for driving a motor, which are capable of improving efficiency of an inverter by selectively applying a modulation method according to a position of a voltage reference in a hexagonal space voltage vector diagram.

BACKGROUND

Generally, a system for driving a motor includes a power storage device (e.g., a battery), an inverter for converting direct current (DC) power, which is stored in the power storage device, into alternating current (AC) power for driving a motor, and the motor.

Here, the inverter may include a plurality of switching elements, and the plurality of switching elements may be controlled by a pulse width modulation (PWM) method to generate the AC power. The AC power generated by the inverter is supplied to the motor and thus the motor is driven.

Various methods are known as a PWM method for controlling switching elements in an inverter, and recently, a space vector PWM (SVPWM) has been widely applied in the industry. According to the SVPWM, a vector [000] and a vector [111], which are invalid vectors, have the same magnitude, and a valid vector and an invalid vector alternately appear twice during a single switching cycle and thus a motor ripple has twice a switching frequency. Further, since the invalid vectors [000] and [111] are used, all switches perform an ON/OFF operation once. Owing to the above-described features, the SVPWM has a disadvantage in that the number of switching times is increased to cause a switching loss.

A discontinuous PWM (DPWM) method is known as one of alternative PWM methods for reducing a switching loss generated in the SVPWM. In the DPWM method, since a single switch does not perform ON/OFF operations during a single switching cycle, an actual number of switching times is reduced to ⅔ of the number of switching times in the SVPWM method.

However, since a valid vector and an invalid vector appear once per switching cycle, there is a disadvantage in that a motor current ripple becomes equal to a switching frequency such that a magnitude of the motor current ripple becomes larger than that of the SVPWM. That is, in consideration of the same current ripple, using the SVPWM may reduce the number of switching times. Therefore, in the present industry, the SVPWM method is widely used for inverter switching control.

There is a need in the art for a new pulse width modulation technique which can overcome disadvantages of the SVPWM method in which an inverter loss is increased due to an increase in number of switching times and the DPWM method in which a current ripple is increased.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an apparatus and a method for controlling an inverter for driving a motor, which are capable of improve efficiency of the inverter by selectively applying a modulation method according to a position of a voltage reference in a hexagonal space voltage vector diagram to reduce the number of switching times and a current ripple.

According to an exemplary embodiment of the present disclosure, an apparatus for controlling an inverter for driving a motor includes: a current controller configured to generate a d/q-axis voltage reference for allowing a d/q-axis current detection value, which is obtained by measuring a current supplied from the inverter to the motor, to converge on the d/q-axis current reference for driving the motor, and a voltage modulator configured to control switching of the inverter by selectively applying one among a plurality of predetermined pulse width modulations (PWM) based on a point at which the d/q-axis voltage reference is located in a hexagonal space voltage vector diagram.

When the d/q-axis voltage reference is located on a diagonal line passing through a center of the hexagon in the space voltage vector diagram, the voltage modulator may apply a discontinuous PWM (DPWM) method.

When the d/q-axis voltage reference is located inside the hexagon except for a diagonal line passing through a center of the hexagon in the space voltage vector diagram, the voltage modulator may apply a space vector PWM (SVPWM) method.

When the DPWM method is applied to the d/q-axis voltage reference located on the diagonal line passing through the center of the hexagon, the number of switching times may be ⅓ of the number of switching times when the SVPWM method is applied in the space voltage vector diagram.

When the d/q-axis voltage reference is located within a predetermined range from a diagonal line passing through a center of the hexagon in the space voltage vector diagram, the voltage modulator may apply a DPWM method.

When the d/q-axis voltage reference is located within the predetermined range from the diagonal line passing through the center of the hexagon in the space voltage vector diagram, the voltage modulator may correct the d/q-axis voltage reference onto a point on an adjacent diagonal line to apply the DPWM method.

The voltage modulator may determine whether the d/q-axis voltage reference is located in an area within a predetermined range from the diagonal line passing through the center of the hexagon in the space voltage vector diagram by converting the d/q-axis voltage reference into three-phase phase voltage references based on results of comparing differences in magnitude between a first phase voltage reference having a largest magnitude among the converted three-phase voltage references and a second phase voltage reference thereamong and differences in magnitude between the second phase voltage reference and a third phase voltage reference having a smallest magnitude thereamong.

When the difference in magnitude between the first phase voltage reference and the second phase voltage reference is equal to or less than a predetermined value or when the difference in magnitude between the second phase voltage reference and the third phase voltage reference is equal to or less than the predetermined value, the voltage modulator may determine the d/q-axis voltage reference as being present in the area within the predetermined range from the diagonal line passing through the center of the hexagon in the space voltage vector diagram.

When the difference in magnitude between the first phase voltage reference and the second phase voltage reference is equal to or less than the predetermined value, the voltage modulator may correct the magnitude of the second phase voltage reference to the magnitude of the first phase voltage reference to correct the d/q-axis voltage reference onto a point on an adjacent diagonal line.

When the difference in magnitude between the second phase voltage reference and the third phase voltage reference is equal to or less than the predetermined value, the voltage modulator may convert the magnitude of the second phase voltage reference into the magnitude of the third phase voltage reference.

When the d/q-axis voltage reference is located inside the hexagon except for the diagonal line passing through the center of the hexagon in the space voltage vector diagram, the SVPWM method may be applied.

According to another exemplary embodiment of the present disclosure, a method for controlling an inverter for a motor driving includes: generating, by a controller, a d/q-axis voltage reference for allowing a d/q-axis current detection value, which is obtained by measuring a current supplied from the inverter to the motor, to converge on the d/q-axis current reference for driving the motor; comparing, by the controller, a difference in magnitude between a first phase voltage reference having a largest magnitude among three-phase phase voltage references and a second phase voltage reference having an intermediate magnitude and a difference in magnitude between the second phase voltage reference and a third phase voltage reference having a smallest magnitude; and when the difference in magnitude between the first phase voltage reference and the second phase voltage reference is equal to or less than a predetermined value or when the difference in magnitude between the second phase voltage reference and the third phase voltage reference is equal to or less than the predetermined value, correcting, by current controller, a value on a diagonal line passing through a center of a hexagon of a space voltage vector diagram, and controlling switching of the inverter by applying a discontinuous pulse width modulation (DPWM) method based on the converted three-phase phase voltage references.

When the difference in magnitude between the first phase voltage reference and the second phase voltage reference is equal to or less than the predetermined value, the correcting may include converting the magnitude of the second phase voltage reference into the magnitude of the first phase voltage reference.

When the difference in magnitude between the second phase voltage reference and the third phase voltage reference is equal to or less than the predetermined value, the correcting may include converting the magnitude of the second phase voltage reference into the magnitude of the third phase voltage reference.

The method may further include, as the comparison result of the comparing, when the difference in magnitude between the first phase voltage reference and the second phase voltage reference is greater than the predetermined value or the difference in magnitude between the second phase voltage reference and the third phase voltage reference is greater than the predetermined value, applying a space vector PWM (SVPWM) to control the switching of the inverter on the basis of the three-phase voltage references converted in the converting.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, an apparatus and a method for controlling an inverter for driving a motor according to various embodiments will be described in more detail with reference to the accompanying drawings.

Figure 1:
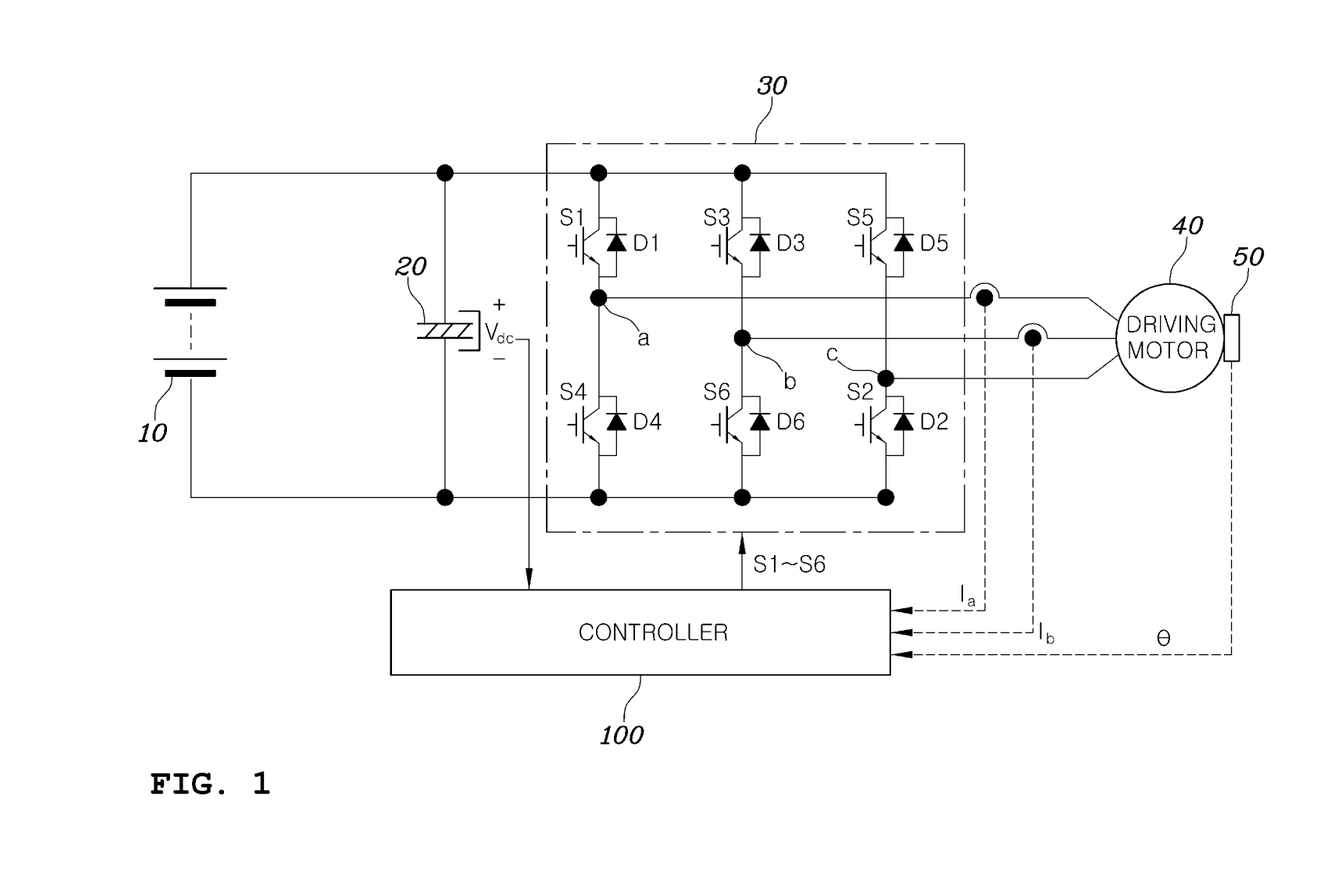
FIG. 1 is a circuit diagram illustrating a motor drive system to which an apparatus and a method for controlling an inverter for driving a motor according to one embodiment of the present disclosure is applied.

FIG. 1 is a circuit diagram illustrating a motor drive system to which an apparatus for controlling an inverter for driving a motor according to one embodiment of the present disclosure is applied.

Referring to FIG. 1, the motor drive system, to which the apparatus for controlling an inverter for driving a motor according to one embodiment of the present disclosure is applied, may include an energy storage device 10, a direct current (DC) link capacitor 20 connected between both ends of the energy storage device 10, an inverter 30, a motor 40, a rotation angle sensor 50, and a controller 100.

The energy storage device 10 outputs DC power as a component, such as a battery, for storing electric energy in the form of a DC for driving the motor 40.

The DC link capacitor 20 is connected to both ends of the energy storage device 10 to form a DC link voltage $V_{dc}$ through charging. The DC link voltage Vdc becomes an input voltage of the inverter 30.

The inverter 30 is a component for converting the DC power stored in and provided from the energy storage device 10 into alternating current (AC) power for driving the motor 40 and may include a plurality of switching elements S1 to S6, each of which ON/OFF states are controlled by a PWM signal provided from the controller 100. Switching of the inverter 30 can be understood to mean switching of a three-phase voltage which is output from the inverter 30.

The motor 40 is a component for receiving three-phase AC power supplied from the inverter 30 to generate a rotational force and may employ various types of motors known in the art. In an eco-friendly vehicle, the motor 40 may be referred to as a drive motor as a motor for providing a rotational force to a driving wheel of the eco-friendly vehicle.

The rotation angle sensor 50 is a component for detecting a position of a rotor of the motor 40, i.e., a rotation angle thereof and may detect an angle of the rotor of the motor 40 to continuously output a rotation angle detection signal including information on a detected rotation angle of the rotor. For example, the rotation angle sensor 50 may be implemented with a resolver or the like.

The controller 100 may basically control of a PWM method to appropriately adjust a duty cycle (duty ratio) of each of the switching elements S1 to S6 of the inverter 30 so as to control a torque of the motor 40 to a desired value. To this end, the controller 100 derives torque-related information of the currently driven motor 40 on the basis of a signal supplied from the rotation angle sensor 50 and detected values $I_a$ and $I_b$ of currents which are provided to the motor 40. Then, on the basis of a comparison result between an externally input torque reference value for the motor 40 (a target torque value which will be obtained through the motor 40) and the torque-related information of the currently driven motor 40, the controller 100 controls the switching elements S1 to S6 in the inverter 30 to allow the motor 40 to output a value corresponding to the externally input torque reference value. In the present disclosure, the controller 100 may be an electronic control unit (ECU).

In one embodiment of the present disclosure, the controller 100 may generate gate signals for controlling the switching elements S1 to S6 in the inverter 30 by selectively changing and applying a modulation method according to a position of a voltage reference on a hexagonal space voltage vector diagram.

In FIG. 1, the controller 100 may be the apparatus for controlling an inverter according to the present disclosure, and a method for controlling an inverter, which is performed by the controller 100, may be a method for controlling an inverter according to the present disclosure.

Figure 2:
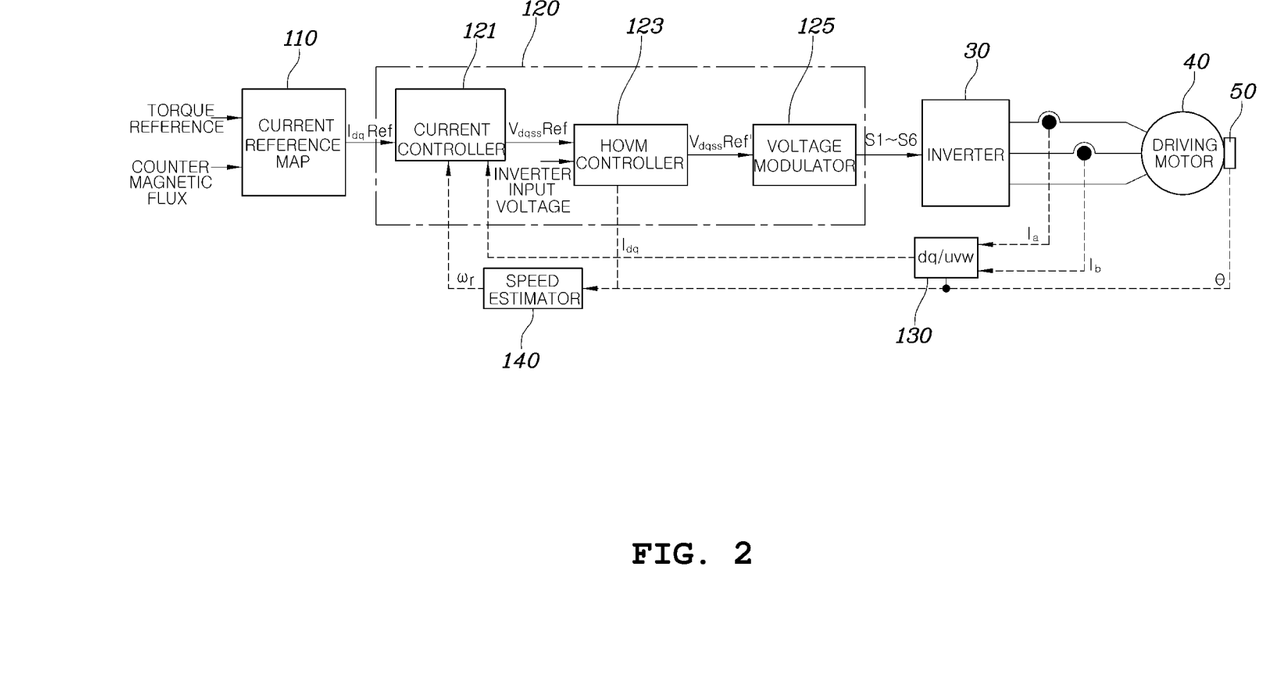
FIG. 2 is a block diagram illustrating in more detail the apparatus for controlling an inverter for driving a motor according to one embodiment of the present disclosure.

FIG. 2 is a block diagram illustrating in more detail the apparatus for controlling an inverter for driving a motor according to one embodiment of the present disclosure, and it can be understood that FIG. 2 illustrates a system configured with a detailed configuration of the controller 100 of FIG. 1, the inverter 30 configured to be controlled by the controller 100, and the motor 40 configured to be driven by receiving a three-phase voltage from the inverter 30.

Referring to FIG. 2, the apparatus for controlling an inverter for driving a motor (the controller 100 of FIG. 1) according to one embodiment of the present disclosure may include a current reference map 110 for receiving an externally input torque reference and a counter magnetic flux of the motor 40 and outputting a current reference $I_{dq}$REF corresponding to the externally input torque reference and the counter magnetic flux, a current control task part 120 for generating a voltage reference $V_{dqss}$REF for directing a detected current value to converge on the current reference $I_{dq}$REF by comparing the current reference $I_{dq}$REF with the detected current value obtained by detecting a current provided to the motor 40 and for generating a gate signal for controlling ON/OFF operations of each of the switching elements S1 to S6 through a PWM so as to generate an output of the inverter 30 corresponding to the voltage reference $V_{dqss}$REF, a coordinate transformer 130 for converting a value, which is obtained by detecting phase currents $I_a$ and $I_b$ provided to the motor 40, into a d/q-axis current $I_{dq}$, and a speed estimator 140 for deriving a rotational speed of the motor 40 using a position of a rotor of the motor 40, which is detected by the rotation angle sensor 50.

In the present disclosure, the current reference map 110, the control task part 120, the coordinate transformer 130, and the speed estimator 140 may be separately connected to and controlled by the controller 100 or embedded in the controller 100 as one unit.

The current reference map 110 may store in advance a torque reference for the motor 40 and the current reference $I_{dq}$REF which is simultaneously mapped in the counter magnetic flux of the motor 40. Accordingly, the current reference map 110 receives a torque reference of the motor 40, which is input from an external higher level controller, and a value obtained by detecting the counter magnetic flux output from the motor 40 and outputs the current reference $I_{dq}$REF corresponding to the torque reference and the received value. The current reference $I_{dq}$REF may have a form of a d/q axis current reference of the stationary reference frame.

In the embodiment of FIG. 2, the current reference map 110 has been described as receiving a value of the torque reference for the motor 40 and a value of the counter magnetic flux of the motor 40 as two input values to output the current reference $I_{dq}$REF mapped to the two input values, but this is merely an example, and alternatively, the current reference map 110 may output a current reference using a map in which a current reference is mapped to an input value having a different form on the basis of the input value. Further, the current reference map 110 is merely a methodological example being capable of being applied to generate a current, and it is possible to derive a current reference by performing an arithmetic operation other than a map, e.g., by substituting a specific input value into a predetermined mathematical expression or the like.

The current control task part 120 may include a current controller 121, a high-gain over voltage modulation (HOVM) controller 123, and a voltage modulator 125.

The current controller 121 may receive the d/q-axis current reference $I_{dq}$REF from the current reference map 110, receive a value $I_{dq}$ obtained by converting detected current values $I_a$ and $I_b$, which are obtained by actually measuring currents supplied from the coordinate transformer 130 to the motor 40, into d/q-axis current, and receive a rotational speed (rotation frequency) $\omega_r$ of the motor 40, which is estimated by the speed estimator 140. The current controller 121 may generate a voltage reference $V_{dqss}$Ref using received information. More specifically, the current controller 121 may generate the voltage reference VdqssRef using a difference component between the d/q- axis current reference $I_{dq}$REF output from the current reference map 110 and the actually measured d/q-axis current $I_{dq}$. Particularly, the current controller 121 is implemented in the form of a proportional integral (PI) controller to generate a d/q-axis voltage reference (stationary reference frame) capable of controlling the actually measured d/q-axis current $I_{dq}$ to converge on the d/q-axis current reference $I_{dq}$REF by performing a proportional integral operation on a difference component between the d/q-axis current reference $I_{dq}$REF and the actually measured d/q-axis current $I_{dq}$.

The HOVM controller 123 generates a gain over voltage modulated output voltage reference $V_{dqss}$REF' by multiplying the voltage reference $V_{dqss}$REF output from the current controller 121 by a predetermined gain. The HOVM is an acronym for "High-gain Over Voltage Modulation" and is a technique for generating and modulating the voltage reference $V_{dqss}$REF' by multiplying the voltage reference $V_{dqss}$REF output from the current controller 121 by a high gain. In FIG. 2, the HOVM controller 123 is a component which may be selectively applied and is merely described as an example constituting the current control task part 120. Since the main technical spirit of the present disclosure is to selectively apply a PWM technique for generating a gate signal provided to the inverter 30 on the basis of a point at which a voltage reference is located in the hexagonal space voltage vector diagram, even though the HOVM controller 123 is omitted, the implementation of the present disclosure is not affected. However, in the example in which the HOVM controller 123 is applied, a PWM technique may be selectively applied on the basis of a point at which the voltage reference $V_{dqss}$REF' to which a gain outputted from the HOVM controller 123 is applied is located in the hexagonal space voltage vector diagram.

The voltage modulator 125 generates a gate signal for determining an ON or OFF state of a switching element in the inverter 30 by selecting and applying one of a plurality of predetermined PWM techniques on the basis of a point at which a voltage reference $V_{dqss}$REF (a voltage reference $V_{dqss}$REF' to which a gain is applied in the example of applying the HOVM controller 123) is located in a hexagon space voltage vector diagram.

The voltage modulator 125 is a core component for implementing the main technical spirit of the present disclosure. Hereinafter, a configuration and an operation of the voltage modulator 125 will be described in more detail.

Figure 3:
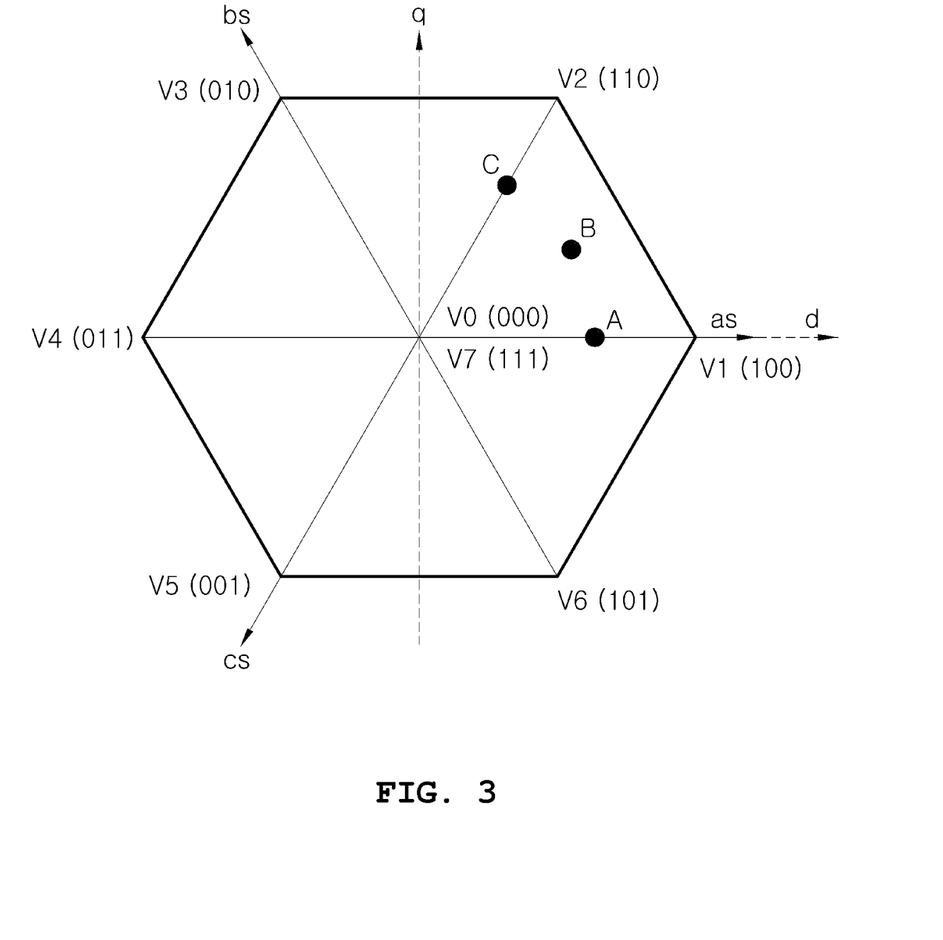
FIG. 3 is a space voltage vector diagram for describing the apparatus for controlling an inverter for driving a motor according to one embodiment of the present disclosure.

FIG. 3 is a space voltage vector diagram for describing the apparatus for controlling an inverter for driving a motor according to one embodiment of the present disclosure.

In a voltage vector diagram of FIG. 3, a hexagon represents voltage vectors and a distance from the origin to a vertex may be determined by a DC inverter input voltage $V_{dc}$ input to the inverter 30. In the voltage vector diagram, the voltage reference $V_{dqss}$REF may be expressed as a circle about the center of the hexagon (the origin of coordinates). The center (origin) and each vertex of the hexagon represent an inverter output voltage vector.

In one embodiment of the present disclosure, the voltage modulator 125 may primarily select a modulation method on the basis of whether a point at which a voltage reference is located is present on a diagonal line passing through the center of the hexagon in the hexagonal voltage vector diagram. For example, when the point such as a point "A" or "C" of FIG. 3, at which the voltage reference is located, is present on a diagonal line passing through the center of the hexagon in the hexagonal voltage vector diagram, the voltage modulator 125 may apply a DPWM technique. Alternatively, when the voltage reference is located at a point B which is not present on the diagonal line passing through the center of the hexagon in the hexagonal voltage vector diagram, the voltage modulator 125 may apply a technique, such as an SVPWM technique or the like, other than the DPWM technique.

Figure 4A:
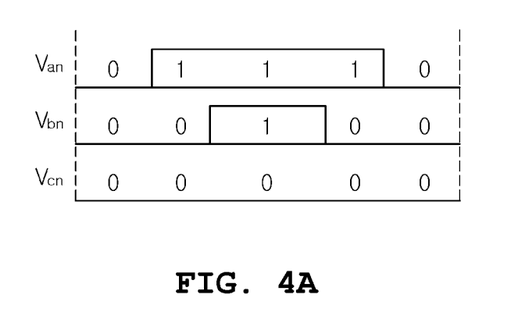
FIGS. 4A to 4C are diagrams illustrating a portion of a switching pattern of a discontinuous pulse width modulation (DPWM) to help understand the apparatus and the method for controlling an inverter for driving a motor according to one embodiment of the present disclosure.
Figure 4B:
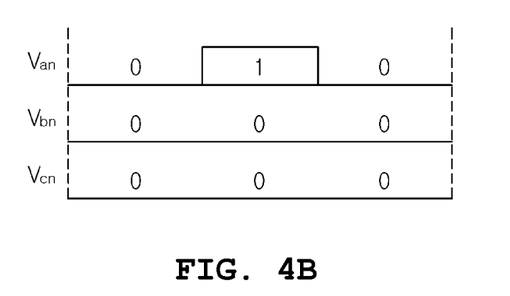
Figure 4C:
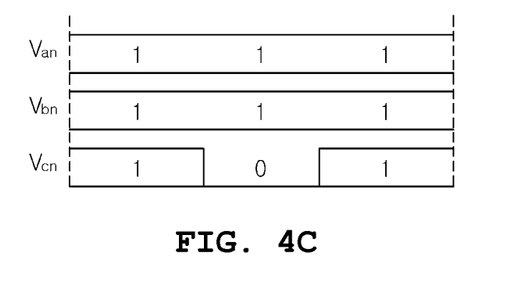
Figure 5A:
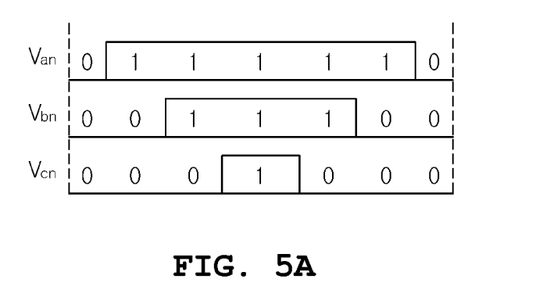
FIGS. 5A to 5C are diagrams illustrating a portion of a switching pattern of a space vector pulse width modulation (SVPWM) to help understand the apparatus and the method for controlling an inverter for driving a motor according to one embodiment of the present disclosure.
Figure 5B:
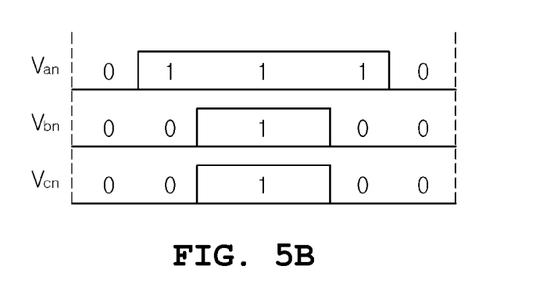
Figure 5C:
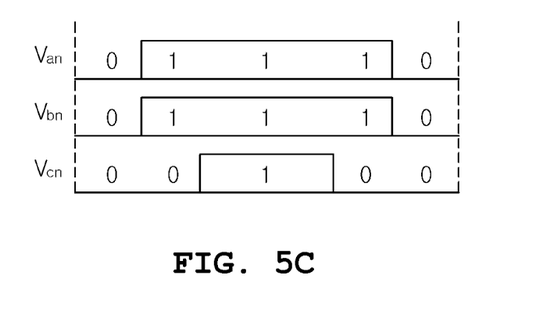

FIGS. 4A to 4C are diagrams illustrating a portion of a switching pattern of a DPWM to help understand the apparatus and the method for controlling an inverter for driving a motor according to one embodiment of the present disclosure. Further, FIGS. 5A to 5C are diagrams illustrating a portion of a switching pattern of an SVPWM to help understand the apparatus and the method for controlling an inverter for driving a motor according to one embodiment of the present disclosure.

Generally, the DPWM is a modulation method for determining a switching pattern to have a single invalid vector (one among V0 to V7 of FIG. 3) during a single period according to a sector in which a vector of a d/q voltage reference is present among triangular sectors divided by diagonal lines passing through the center of the hexagon on the space voltage vector diagram. FIG. 4A illustrates a switching pattern in which a d/q voltage reference vector located at a point indicated by a reference numeral "B" in FIG. 3 is modulated with the DPWM, and switching for one phase among three phases in the switching pattern of one cycle is not performed. Therefore, when the DPWM is applied, the number of times of switching of each of two switches in one cycle is two times, i.e., once from an ON state to an OFF state and once from the OFF state to the ON state so that the two switches will be switched four times in total.

The SVPWM is a method for performing a modulation using two valid vectors (two voltage vectors among V1 to V6 of FIG. 3) and tow invalid vectors (V0 and V7 of FIG. 3) which are closest to a reference voltage vector according to a sector in which a vector of a d/q voltage reference is present among triangular sectors divided by the diagonal line passing through the center of the hexagon on the space voltage vector diagram. FIG. 5A illustrates a switching pattern in which the d/q voltage reference vector located at the point indicated by the reference numeral "B" in FIG. 3 is modulated with the SVPWM, and since switching is performed twice at each of the three phases, overall switches perform a switching six times in total during a single period.

Therefore, when the DPWM is applied, the modulation may be performed by ⅔ of the number of switching times compared with the application of the SVPWM.

When the d/q voltage reference vector is located on the diagonal line passing through the center of the hexagon (when the voltage reference vector is located at the reference numeral "A" or "B" of FIG. 3), the voltage reference vector may be modulated by only a total of two switching operations as shown in FIGS. 4B and 4C. That is, as shown in FIGS. 4B and 4C, since two phases require voltages having the same magnitude, it is possible to perform a modulation of turning switches of the two phases off (FIG. 4B) or turning the switches of the two phases on (FIG. 4C).

As shown in FIGS. 5B and 5C, when the SVPWM is used, switching occurs at all the three phases and three switching operations are performed in total.

That is, when the d/q voltage reference is located on the diagonal line passing through the center of the hexagon of the space voltage vector diagram, the DPWM may modulate the same voltage reference with only ⅓ switching compared to that of the SVPWM.

Since the SVPWM generates each of two invalid vectors (V0 and V7 of FIG. 3) once per cycle, a ripple is formed to have a frequency twice a switching frequency. In the case of the DPWM, one of the invalid vectors is formed once per cycle, and thus a ripple occurs at the switching frequency. Therefore, a magnitude of a switching ripple of the DPWM is larger than that of the SVPWM. In general, it is known that the DPWM may obtain a magnitude of a current ripple the same as that of the SVPWM by performing switching at a frequency twice as high as that of the SVPWM. In the case of using the DPWM with a double switching frequency so as to obtain an equivalent current ripple level, a switching operation is performed 4/3 times compared with that of the SVPWM. Thus, the number of switching times increases rather than that of the SVPWM so that the DPWM does not have an advantage over the SVPWM in terms of a switching loss.

However, as described above, when the DPWM is performed on the diagonal line passing through the center of the hexagon of the space voltage vector diagram, the switching operation is performed ⅓ times so that even when a double switching frequency is used to obtain the equivalent ripple level, an equivalent ripple level may be obtained with only a ⅔ switching compared to that of the SVPWM.

In consideration of the above-described features, one embodiment of the present disclosure selectively determines a PWM method on the basis of the point at which the d/q voltage reference (vector) is located on the hexagon of the space voltage vector diagram. Particularly, in one embodiment of the present disclosure, when the d/q voltage reference (vector) is located on the diagonal line passing through the center of the hexagon of the space voltage vector diagram, the DPWM capable of achieving a relative reduction in number of switching times may be applied to perform a modulation and when the d/q voltage reference (vector) is located on a point other that the diagonal line, the SVPWM having an excellent current ripple characteristic may be applied to perform a modulation. The application of such modulations may be performed in the voltage modulator 125.

Meanwhile, in another embodiment of the present disclosure, when the d/q voltage reference is located adjacent to the diagonal line passing through the center of the hexagon of the space voltage vector diagram, the d/q voltage reference is regarded as being located on the diagonal line so that the DPWM may be applied.

Figure 6:
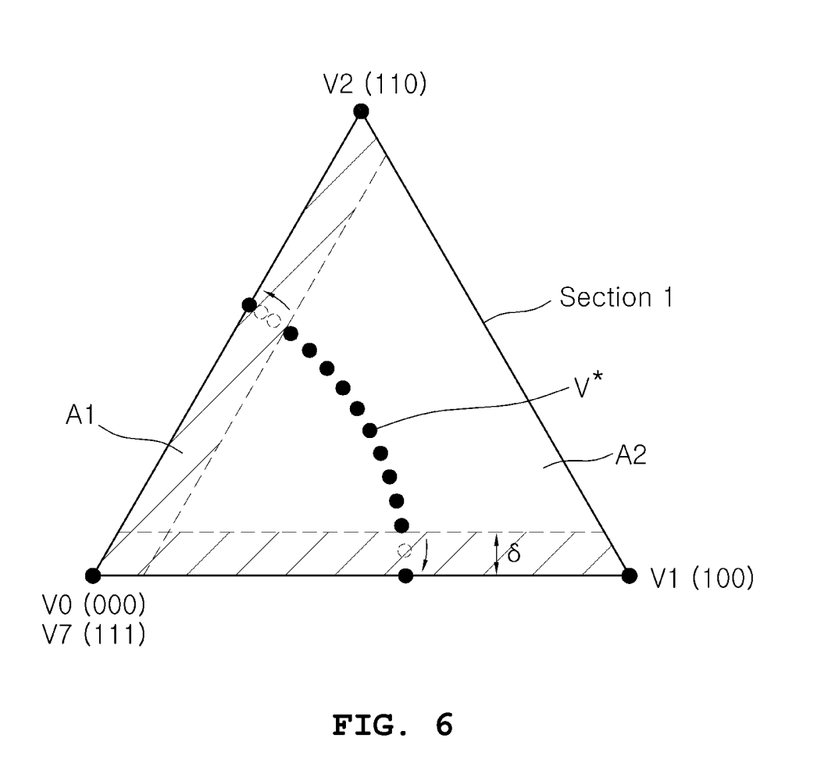
FIG. 6 is a diagram illustrating a portion of a PWM application area of a space voltage vector diagram to help understand an apparatus and a method for controlling an inverter for driving a motor according to another embodiment of the present disclosure.

FIG. 6 is a diagram illustrating a portion of a PWM application area of a space voltage vector diagram to help understand an apparatus and a method for controlling an inverter for driving a motor according to another embodiment of the present disclosure. Particularly, FIG. 6 illustrates Area A1 to which the DPWM is applied and Area A2 to which the SVPWM is applied in a sector (Sector 1) which is formed by a triangle made of vectors of V0, (or V7), Va, and V2 in the hexagon shown in FIG. 3.

As shown in FIG. 6, in one embodiment of the present disclosure, when a d/q-axis voltage reference V* is present in an area within a predetermined range $V_\delta$ from the diagonal line passing through the center of the hexagon of the space voltage vector diagram, the d/q voltage reference V* may be regarded as being located on the diagonal line and thus may be modulated by applying a DPWM corresponding to a voltage reference on the diagonal line.

As described above, the voltage reference may be expressed in a circle on the space voltage vector diagram. In one embodiment of the present disclosure, when the d/q-axis voltage reference V* is present in the area within the predetermined range $V_\delta$ from the diagonal line passing through the center of the hexagon of the space voltage vector diagram, the DPWM may be applied by regarding that the d/q-axis voltage reference V* is present at an intersection of a most adjacent diagonal line at which the d/q-axis voltage reference V* meets a trajectory of a circle with the center of the hexagon as a radius.

Figure 7:
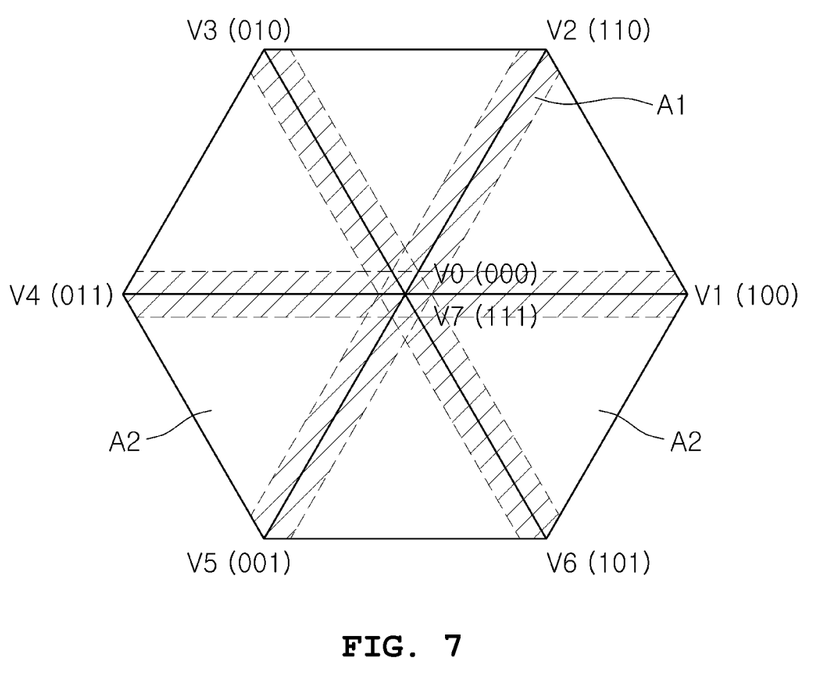
FIG. 7 is a diagram illustrating the PWM application area shown in FIG. 6 extending on an overall space voltage vector diagram.

FIG. 7 is a diagram illustrating the PWM application area shown in FIG. 6 extending on an overall space voltage vector diagram.

As shown in FIG. 7, in one embodiment of the present disclosure, Area A1 within the predetermined range $V_\delta$ from the diagonal line passing through the center of the hexagon of the space voltage vector diagram and a hexagonal inner area A2 excluding Area A1 may be set in advance. When a voltage reference is included in Area A1, the DPWM may be performed by regarding the voltage reference is present at a point at which the voltage reference intersects with a diagonal line closest to a trajectory of a circle formed by the center of the hexagon. Alternatively, the voltage reference is included in the area A2, the SVPWM may be performed.

Figure 8:
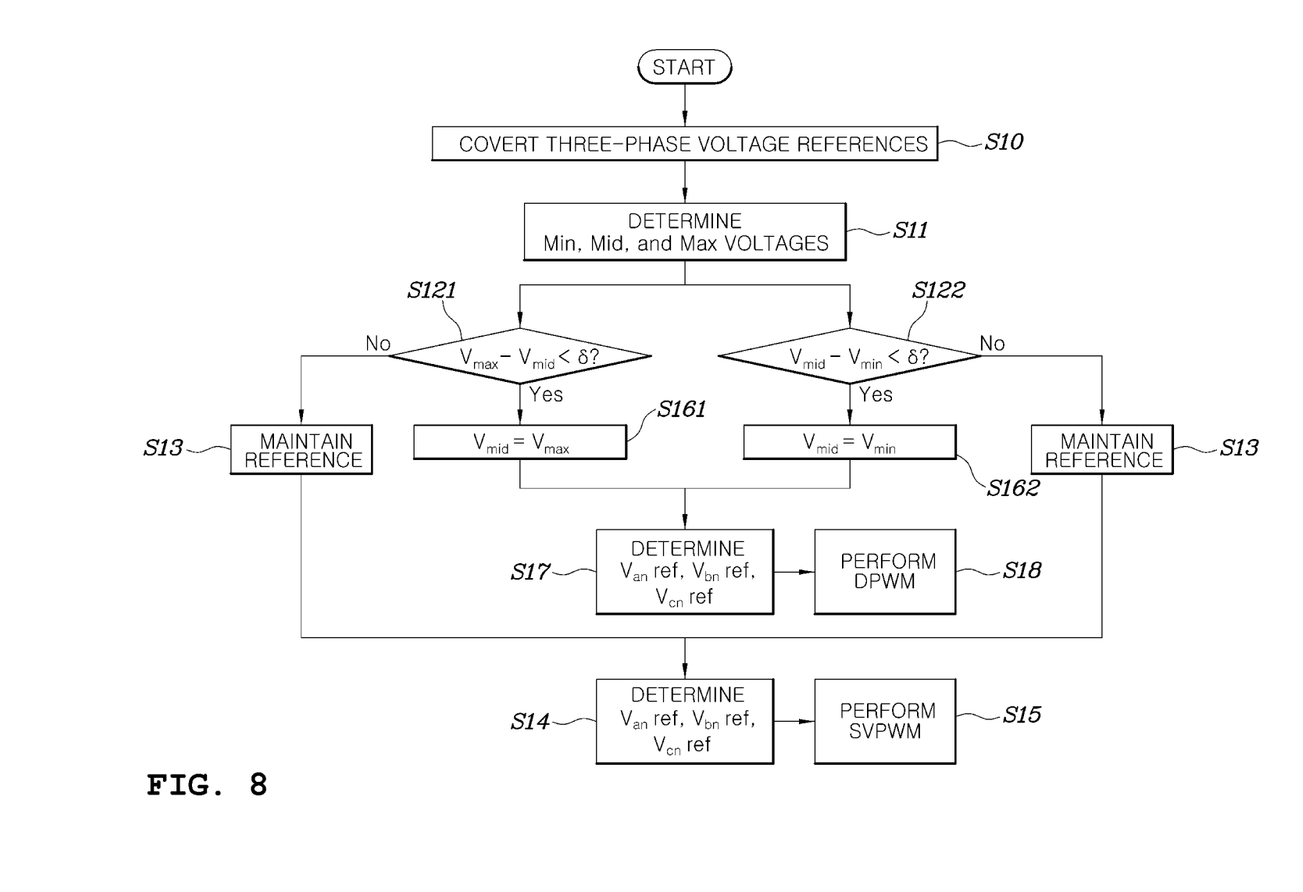
FIG. 8 is a flowchart illustrating the method for controlling an inverter for driving a motor according to one embodiment of the present disclosure.

FIG. 8 is a flowchart illustrating a method for controlling an inverter for driving a motor according to one embodiment of the present disclosure. Particularly, FIG. 8 is a diagram for describing a method for performing the embodiment described through FIGS. 6 and 7. The method for controlling an inverter for driving a motor according to one embodiment of the present disclosure may be performed by the voltage modulator 125 of the apparatus for controlling an inverter for driving a motor according to one embodiment of the present disclosure.

Referring to FIG. 8, the method for controlling an inverter for driving a motor according to one embodiment of the present disclosure may start from Operation S10 of converting a d/q voltage reference received by the voltage modulator 125 into three-phase voltage references.

Next, the voltage modulator 125 sorts the converted three-phase voltage references in order of a magnitude in Operation S11 and determines whether a difference in magnitude between a largest phase voltage reference and an intermediate phase voltage reference is equal to or less than a predetermined value $V_\delta$ in Operation S121, or whether a difference in magnitude between the intermediate phase voltage reference and a smallest phase voltage reference is equal to or less than the predetermined value $V_\delta$ in Operation S122.

For example, in the case of a diagonal line passing through [011] and [100] in the hexagon shown in FIG. 7, a d-axis voltage value on the stationary reference frame is variable and a q-axis voltage value becomes zero. In this case, determining in terms of an equation for a d/q conversion, in order to allow the q-axis voltage to be zero, a phase voltage $V_{bs}$ of a b-phase and a phase voltage $V_{cs}$ of a c-phase should coincide with each other. In the case of a diagonal line between [000] and [100], $V_{as}$ is a maximum section, and in the case of a diagonal line between [011] and [000], $V_{as}$ is a minimum section. In such sections, when a difference between $V_{bs}$ and $V_{cs}$ has $\pm V_\delta$ on the basis of $V_{eq}$, $V_{qs}$ may be determined by the following equation.

$$V_{qs} = \frac{2}{3}\left[\frac{\sqrt{3}}{2}V_{bs} - \frac{\sqrt{3}}{2}V_{cs}\right] = \left[\frac{\sqrt{3}}{2}(V_{eq} \pm V_\delta) - \frac{\sqrt{3}}{2}V_{eq}\right] = \pm\frac{1}{\sqrt{3}}V_\delta \quad \text{[Equation]}$$

As in the above-described equation, when a difference between two phases of the converted three-phase voltage references calculated, it is possible to determine whether a voltage reference is present on the diagonal line and within the predetermined value $V_\delta$ in the hexagon of FIG. 7. As described above, since $V_{as}$ has a maximum value in a section between [100] and [000] among diagonal lines between [011] and [100], it is possible to determine whether the voltage reference is present within the predetermined value $V_a$ corresponding to a set range with respect to the diagonal lines by comparing the converted three-phase voltage reference having an intermediate value and a minimum value, and since $V_{as}$ has a minimum value in a section between [000] and [011], it is possible to determine whether the voltage reference is present within the predetermined value $V_\delta$ by comparing the converted three-phase voltage reference having a maximum value and the intermediate value.

When the description for the diagonal lines between [100] and [011] is symmetrically converted and applied to diagonal lines between [110] and [001] and diagonal lines between [010] and [101] in FIG. 7, the same result may be obtained and thus a detailed description thereof will be omitted.

As the determination result of Operation S121, when a difference in magnitude between the largest phase voltage reference and the intermediate phase voltage reference is greater than the predetermined value $V_\delta$, and as the determination result of Operation S122, when a difference in magnitude between the intermediate phase voltage reference and the smallest phase voltage reference is greater than the predetermined value $V_\delta$, an existing voltage reference is maintained in Operation S13.

Then, in Operation S14, three-phase voltage references are determined on the basis of the converted three-phase voltage references in Operation S10, and a modulation is performed using an SVPWM technique to generate a gate voltage for switching control of the inverter 30 in Operation S15.

As the determination result in Operation S121, when the difference in magnitude between the largest phase voltage reference and the intermediate phase voltage reference is equal to or less that the predetermined value $V_\delta$, and as the determination result of Operation S122, when the difference in magnitude between the intermediate phase voltage reference and the smallest phase voltage reference is equal to or less than the predetermined value $V_\delta$, as described through FIGS. 6 and 7, the d/q voltage reference (vector) may be determined as being present in Area A1 adjacent to the diagonal line passing through the center of the hexagon of the space voltage vector diagram. Accordingly, as the determination result in Operation S121, when the difference in magnitude between the largest phase voltage reference and the intermediate phase voltage reference is equal to or less than the predetermined value $V_\delta$, the voltage reference may be modified onto the diagonal line of the hexagon by adjusting the magnitude of the largest phase voltage reference to the magnitude of the intermediate phase voltage reference to equalize the largest phase voltage reference with the intermediate phase voltage reference in Operation S161. As the determination result in Operation S122, when the difference in magnitude between the intermediate phase voltage reference and the smallest phase voltage reference is equal to or less than the predetermined value $V_\delta$, the voltage reference may be modified onto the diagonal line of the hexagon by adjusting the magnitude of the smallest phase voltage reference to the magnitude of the intermediate phase voltage reference to equalize the smallest phase voltage reference with the intermediate phase voltage reference in Operation S162.

Operations S161 and S162 are an example of a technique for moving a voltage reference vector onto a diagonal line of a hexagon on a voltage vector diagram, and alternatively, Operations S161 and S162 may move the voltage reference onto the diagonal line while maintaining a magnitude of the voltage reference or may move a voltage reference vector through a mathematical calculation for moving the voltage reference vector to a path closest to the diagonal line.

Then, in Operation S17, three-phase voltage references are determined on the basis of the three-phase voltage references, each of which magnitude is modified in Operations S161 and S162, and a modulation is performed using a DPWM technique to generate a gate voltage for switching control of the inverter 30 in Operation S18.

As described above, the apparatus and the method for controlling an inverter for driving a motor according to various embodiments of the present disclosure can improve efficiency of an inverter by selectively applying a DPWM method capable of reducing a switching loss and an SVPWM method having an excellent current ripple characteristic on the basis of a voltage reference position on a space voltage vector diagram. Particularly, the apparatus and the method for controlling an inverter for driving a motor according to various embodiments of the present disclosure can overcome an effect in reduction of a switching loss due to application of the DPWM method by setting a specific area capable of significantly reducing the number of switching times by the DPWM method and applying the DPWM method when a voltage reference is included in the specific area. Further, the apparatus and the method for controlling an inverter for driving a motor according to various embodiments of the present disclosure has an advantage of preventing additional costs using an algorithm which improves performance of inverter control without changing a design of hardware for the inverter control.

In accordance with the apparatus and the method for controlling an inverter for driving a motor according to various embodiments of the present disclosure, efficiency of an inverter can be improved by selectively applying a DPWM method capable of reducing a switching loss and an SVPWM method having an excellent current ripple characteristic on the basis of a voltage reference position on a space voltage vector diagram.

Particularly, in accordance with the apparatus and the method for controlling an inverter for driving a motor, an effect in reduction of a switching loss due to application of the DPWM method can be overcome by setting a specific area capable of significantly reducing the number of switching times by the DPWM method and applying the DPWM method when a voltage reference is included in the specific area.

Further, in accordance with the apparatus and the method for controlling an inverter for driving a motor, additional costs can be prevented using an algorithm which improves performance of inverter control without changing a design of hardware for the inverter control.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An apparatus for controlling an inverter for driving a motor, the apparatus comprising:
   a current controller configured to generate a d/q-axis voltage reference for allowing a d/q-axis current detection value, which is obtained by measuring a current supplied from the inverter to the motor, to converge on the d/q-axis current reference for driving the motor, and
   a voltage modulator configured to control switching of the inverter by selectively applying one among a plurality of predetermined pulse width modulations (PWMs) based on a point at which the d/q-axis voltage reference is located in a hexagonal space voltage diagram,
   wherein, when the d/q-axis voltage reference is located on a diagonal line passing through a center of the hexagon in the space voltage vector diagram, the voltage modulator applies a discontinuous PWM (DPWM), and
   wherein, when the d/q-axis voltage reference is located inside the hexagon except for the diagonal line passing through the center of the hexagon in the space voltage vector diagram, the voltage modulator applies a space vector PWM (SVPWM).

2. The apparatus of claim 1, wherein, when the DPWM is applied to the d/q-axis voltage reference located on the diagonal line passing through the center of the hexagon, the number of switching times is ⅓ of the number of switching times when the SVPWM is applied in the space voltage vector diagram.

3. An apparatus for controlling an inverter for driving a motor, the apparatus comprising:
   a current controller configured to generate a d/q-axis voltage reference for allowing a d/q-axis current detection value, which is obtained by measuring a current supplied from the inverter to the motor, to converge on the d/q-axis current reference for driving the motor, and
   a voltage modulator configured to control switching of the inverter by selectively applying one among a plurality of predetermined pulse width modulations (PWMs) based on a point at which the d/q-axis voltage reference is located in a hexagonal space voltage vector diagram,
   wherein, when the d/q-axis voltage reference is located within a predetermined range from a diagonal line passing through a center of the hexagon in the space voltage vector diagram, the voltage modulator applies a DPWM.

4. The apparatus of claim 3, wherein, when the d/q-axis voltage reference is located within the predetermined range from the diagonal line passing through the center of the hexagon in the space voltage vector diagram, the voltage modulator corrects the d/q-axis voltage reference onto a point on an adjacent diagonal line to apply the DPWM.

5. The apparatus of claim 4, wherein the voltage modulator determines whether the d/q-axis voltage reference is located in an area within the predetermined range from the diagonal line passing through the center of the hexagon in the space voltage vector diagram by converting the d/q-axis voltage reference into three-phase phase voltage references based on results of comparing differences in magnitude between a first phase voltage reference having a largest magnitude among the converted three-phase voltage references and a second phase voltage reference among the converted three-phase voltage references and differences in magnitude between the second phase voltage reference and a third phase voltage reference having a smallest magnitude among the converted three-phase voltage references.

6. The apparatus of claim 5, wherein, when the difference in magnitude between the first phase voltage reference and the second phase voltage reference is equal to or less than a predetermined value or when the difference in magnitude between the second phase voltage reference and the third phase voltage reference is equal to or less than the predetermined value, the voltage modulator determines the d/q-axis voltage reference as being present in the area within the predetermined range from the diagonal line passing through the center of the hexagon in the space voltage vector diagram.

7. The apparatus of claim 6, wherein, when the difference in magnitude between the first phase voltage reference and the second phase voltage reference is equal to or less than the predetermined value, the voltage modulator corrects the magnitude of the second phase voltage reference to the magnitude of the first phase voltage reference to correct the d/q-axis voltage reference onto the point on the adjacent diagonal line.

8. The apparatus of claim 6, wherein, when the difference in magnitude between the second phase voltage reference and the third phase voltage reference is equal to or less than the predetermined value, the voltage modulator corrects the magnitude of the second phase voltage reference to the magnitude of the third phase voltage reference.

9. The apparatus of claim 3, wherein, when the d/q-axis voltage reference is located inside the hexagon except for the diagonal line passing through the center of the hexagon in the space voltage vector diagram, a space vector PWM (SVPWM) is applied.

10. A method for controlling an inverter for a motor driving, the method comprising steps of:
    generating, by a controller, a d/q-axis voltage reference for allowing a d/q-axis current detection value, which is obtained by measuring a current supplied from the inverter to the motor, to converge on the d/q-axis current reference for driving the motor;
    comparing, by the controller, a difference in magnitude between a first phase voltage reference having a largest magnitude among three-phase phase voltage references and a second phase voltage reference having an intermediate magnitude and a difference in magnitude between the second phase voltage reference and a third phase voltage reference having a smallest magnitude;
    when the difference in magnitude between the first phase voltage reference and the second phase voltage reference is equal to or less than a predetermined value or when the difference in magnitude between the second phase voltage reference and the third phase voltage reference is equal to or less than the predetermined value, correcting, by the controller, a value on a diagonal line passing through a center of a hexagon of a space voltage vector diagram; and
    controlling, by the controller, switching of the inverter by applying a discontinuous pulse width modulation (DPWM) based on the converted three-phase phase voltage references.

11. The method of claim 10, wherein, when the difference in magnitude between the first phase voltage reference and the second phase voltage reference is equal to or less than the predetermined value, the step of correcting includes a step of converting the magnitude of the second phase voltage reference into the magnitude of the first phase voltage reference.

12. The method of claim 10, wherein, when the difference in magnitude between the second phase voltage reference and the third phase voltage reference is equal to or less than the predetermined value, the step of correcting includes a step of converting the magnitude of the second phase voltage reference into the magnitude of the third phase voltage reference.

13. The method of claim 10, further comprising:
as a comparison result of the comparing, when the difference in magnitude between the first phase voltage reference and the second phase voltage reference is greater than the predetermined value or the difference in magnitude between the second phase voltage reference and the third phase voltage reference is greater than the predetermined value, applying a space vector PWM (SVPWM) to control the switching of the inverter based on the three-phase voltage references converted in the step of converting.

* * * * *